United States Patent
Budde

(10) Patent No.: US 7,441,978 B2
(45) Date of Patent: Oct. 28, 2008

(54) BALL SOCKET WITH FILM BACKING

(75) Inventor: Frank Budde, Damme (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/895,146

(22) Filed: Jul. 20, 2004

(65) Prior Publication Data

US 2004/0265047 A1 Dec. 30, 2004

Related U.S. Application Data

(63) Continuation of application No. PCT/DE03/02409, filed on Jul. 17, 2003.

(30) Foreign Application Priority Data

Aug. 26, 2002 (DE) .................. 102 39 652

(51) Int. Cl.
*F16C 11/08* (2006.01)

(52) U.S. Cl. .................. 403/133; 403/132; 403/135; 384/203

(58) Field of Classification Search .......... 403/122, 403/132, 133, 135; 428/408, 411.1; 384/203, 384/298, 299, 300
See application file for complete search history.

(56) References Cited

U.S. PATENT DOCUMENTS

| | | | | | |
|---|---|---|---|---|---|
| 2,865,692 | A | * | 12/1958 | Gossmann | .................. 384/298 |
| 3,094,376 | A | * | 6/1963 | Thomas | ...................... 264/135 |
| 3,408,124 | A | * | 10/1968 | Melton et al. | ............... 403/133 |
| 3,486,778 | A | * | 12/1969 | Herbenar et al. | ............ 403/140 |
| 3,647,249 | A | * | 3/1972 | Baba et al. | .................. 403/140 |
| 3,967,907 | A | * | 7/1976 | Schmidt | ..................... 403/133 |
| 4,054,337 | A | * | 10/1977 | Matt et al. | ................... 384/299 |
| 4,231,673 | A | * | 11/1980 | Satoh et al. | ................. 403/125 |
| 4,324,501 | A | * | 4/1982 | Herbenar | .................... 403/133 |
| 4,629,352 | A | * | 12/1986 | Nemoto | ...................... 403/128 |
| 5,178,482 | A | * | 1/1993 | Wood | .......................... 403/130 |
| 5,407,288 | A | * | 4/1995 | Watanabe | .................... 403/133 |
| 6,726,394 | B2 | * | 4/2004 | Garnier et al. | .............. 403/135 |
| 2001/0004408 | A1 | | 6/2001 | Schliephack et al. | |

FOREIGN PATENT DOCUMENTS

| | | |
|---|---|---|
| DE | 39 40 679 A1 | 6/1991 |
| DE | 41 08 219 A1 | 9/1992 |
| DE | 41 08 219 C2 | 9/1992 |
| DE | 296 16 350 U1 | 10/1997 |
| DE | 296 17 276 U1 | 3/1998 |
| DE | 199 59 199 A1 | 7/2001 |
| GB | 895068 | 4/1962 |
| GB | 2 103 532 | 2/1983 |

* cited by examiner

*Primary Examiner*—Michael P Ferguson
(74) *Attorney, Agent, or Firm*—McGlew & Tuttle, P.C.

(57) ABSTRACT

A bearing shell for a ball and socket joint has a core made of plastic, which is jacketed by a film at least in some areas.

24 Claims, 3 Drawing Sheets

BALL SOCKET WITH FILM BACKING

CROSS REFERENCE TO RELATED APPLICATION

This is a continuation of and claims the benefit (35 U.S.C.§120 and 365(c)) of copending International Application PCT/DE 2003/002409 of Jul. 17, 2003, which designated inter alia the United States and which claims the priority of German Application DE 102 39 652.3 of Aug. 26, 2002. The entire contents of each application is hereby incorporated by reference in its entirety.

FIELD OF THE INVENTION

The present invention pertains to a ball socket for a ball and socket joint especially for motor vehicles, to the process for manufacturing the ball socket, as well as to the ball and socket joint per se.

BACKGROUND OF THE INVENTION

Bearing shells for ball and socket joints especially for motor vehicles are known, for example, from DE 29 617 276 U1. DE 29 617 276 U1 discloses a ball and socket joint, which is extrusion-coated according to a one-component process and in which the bearing shell is produced from a single plastic according to the injection molding technology. This design leads in practice to the problem that when a relatively favorable plastic is used, it is either well suited tribologically in the unreinforced form but lacks sufficient strength, or it possesses good strength properties only if it is reinforced with fibers. However, the fiber reinforcement causes the plastic to loose its good tribological properties. In addition, there is a risk for increased wear due to direct contact and consequently facilitated abrasion on the joint ball of the ball bearing due to the additives added to reinforce the plastic. It would be possible to offer a remedy with a material possessing good mechanical properties and at the same time good tribological properties, but such a material is disadvantageously very expensive.

A process for manufacturing a bearing shell for a ball and socket joint is known, furthermore, from DE 41 082 19 C2. DE 41 082 19 C2 describes a two-component process, in which a sliding layer is first applied to a joint ball. Another layer, consisting of a fiber braiding, is applied to this layer in another operation, which is especially suitable for this purpose. The ball pivot thus coated twice is then inserted into a mounting device, which will then be introduced into the housing of the ball and socket joint. The two-component plastic is injected, so that it embeds in itself the fiber braiding which is in contact with the surface of the joint ball and forms a bearing shell in this combination after cooling. The ball and socket joint is removed from the device after the curing of the plastic and supported with a cover. The drawback of this process is the considerable assembly effort, as a result of which the manufacture is time-comsuming, expensive and prone to errors. The separate operation necessary for applying the fiber braiding also causes additional costs.

The low-pressure process is used for the low-flow application of film and textile decoration backings for the aesthetic covering of plastic moldings for the interior trim of vehicles.

SUMMARY OF THE INVENTION

The object of the present invention is to provide a bearing shell that can be manufactured with good strength and creep properties, coupled with good tribological properties, simply and inexpensively.

The bearing shell according to the present invention, which may be either a one-part or multipart design, has a reinforced plastic, which is jacketed by a film in the area of the joint ball contact surface. Due to the jacketing, the reinforced plastic is advantageously separated from being in direct contact with the joint ball, so that the risk for wear, which may develop on the joint ball due to fibers or mica added for reinforcement, is reduced. This advantageously leads to prolonged service life, because the contact surfaces of the joint ball are protected without having to miss the strength and creep properties improved by the reinforcement.

The process for manufacturing the bearing shell according to the present invention begins with the insertion of a film into an injection mold. After the mold has been closed, a plastic, which forms the core of the bearing shell, is injected behind the film. A bearing shell, which has a film with good tribological properties at least in the area of the joint ball, is thus formed after cooling. Depending on the plastic processed, either the conventional injection molding or the low-pressure process is employed. Components that are largely free from internal stress and have low distortion can be advantageously obtained by the low-pressure process because of the uniform pressure distribution and the comparatively short flow paths. This one-step process is especially advantageous for the processing of duroplastics. Both the conventional injection molding and the low-pressure process may be used to process thermoplastics. Due to the good adhesive properties of duroplastics and thermoplastics, the adhesion between the film and the core does not usually pose any problem. The film and the core adhere to one another without the need for an additional adhesive or an additional heat treatment.

The film and the core may be advantageously manufactured from the said basic material, as a result of which the material costs are reduced. Thermoplastics frequently tend to creep under load at high temperatures. The strength values also decrease as the operating temperature increases. The strength and creep properties can be improved by adding fibers, micas, minerals and/or beads to the core of the bearing shell. An individual adaptation to the strength and creep values required corresponding to the load is possible simply by selecting the quantity of the reinforcing additives to be added to the basic material. Duroplastics have the property of not creeping under load and have a high stability. Moreover, the strength can be increased and the thermal expansion reduced by means of suitable additives.

The good tribological properties of the basic material and consequently also of the film used, which is backed with the reinforced material, avoid abrasive wear on the joint ball of the ball and socket joint, which may develop due to the friction of additives on the joint ball during the operation.

In another embodiment, the bearing shell has slots in the core area, which make possible the tolerance compensation of the bearing shell during the operation. Another possibility of compensating tolerances is offered by the mounting of a rubber ring under the bearing shell.

Possible exemplary embodiments of the subject of the present invention will be explained in greater detail below on the basis of drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
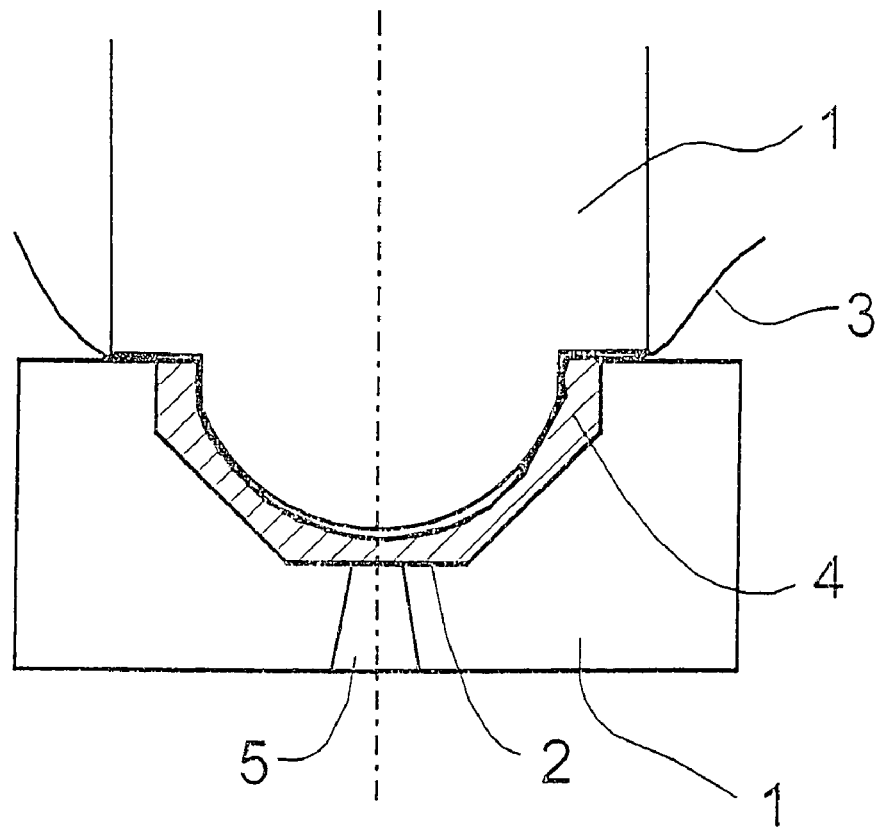
FIG. 1 is a cross sectional view through a bearing shell lower part located in the mold.

FIG. 1 shows a cross section through a bearing shell lower part 2 of a multipart bearing shell, which is in the mold 1. The bearing shell lower part 2 has a film 3 with good tribological properties, which is backed with a reinforcing core 4. To prepare the bearing shell lower part 2, a film 3 is first placed into the mold 1. The film 3 may have been preformed in a preceding step, or the forming may be performed by the heated upper part of the mold 1 only when the film 3 is inserted. After the film 3 has been placed into the mold 1, the mold 1 is closed and a plastic 4 used for reinforcement is sprayed behind the film 3. To do so, a corresponding plastic is allowed to enter the closed mold via the sprue 5. Depending on the plastic to be processed, various processes are used. In case of the processing of thermoplastics, the backing of the film is performed predominantly according to a conventional injection molding process. Because of the good adhesive properties of the plastics used, an additional bonding of the film with the backed plastic is not necessary.

Figure 2:
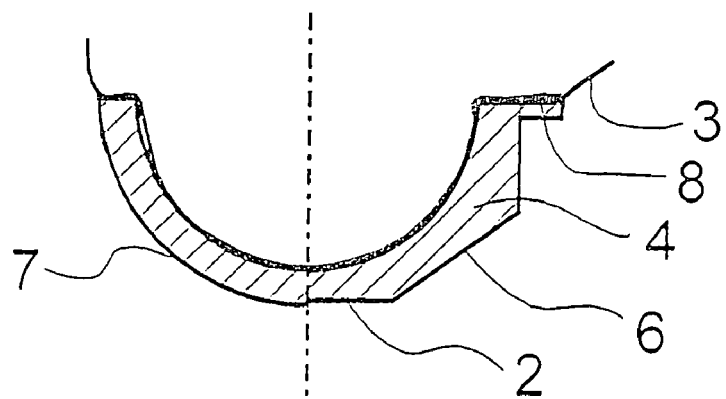
FIG. 2 is a cross sectional view exemplary embodiments for a one-part bearing shell lower part.
Figure 5:
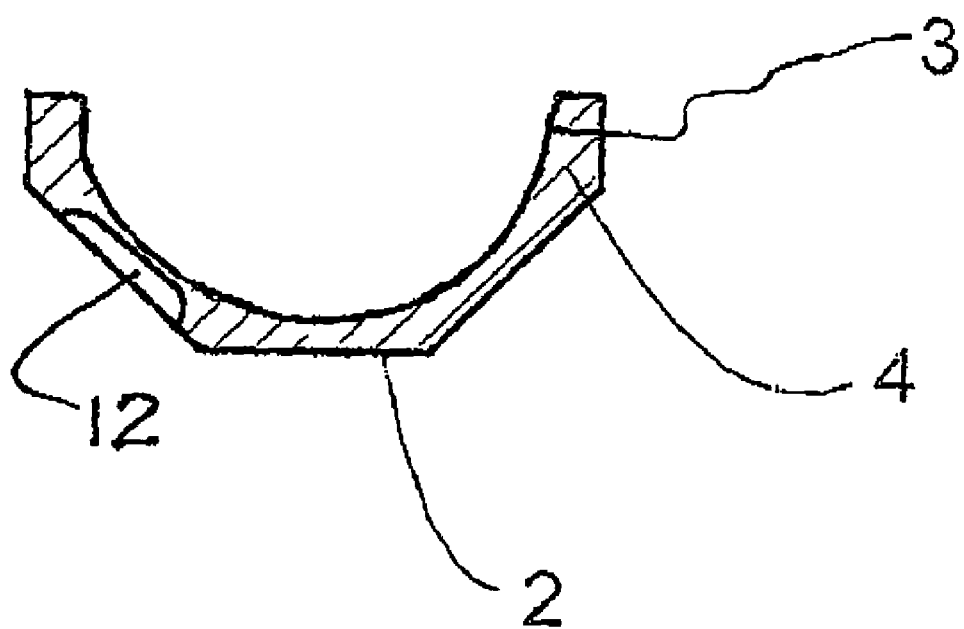
FIG. 5 is a cross sectional view of the of a bearing shell upper part with slot.

FIG. 2 shows various embodiments of a bearing shell lower part manufactured according to FIG. 1. Depending on the shape of the mold, the bottom of the bearing shell lower part may have an angular 6 or round 7 design. An outwardly directed circumferential collar 8 may be made integrally in one piece with the bearing shell lower part in the upper area of the bearing shell. This collar 8 is used as a contact surface of the upper shell to be attached in another step. Slots 12, shown in FIG. 5, in the area of the backing, i.e., in the area of the reinforced plastic 4, can cause an additional tolerance compensation. Depending on the arrangement of the slots, it may be necessary to provide a plurality of sprue points.

Figure 3:
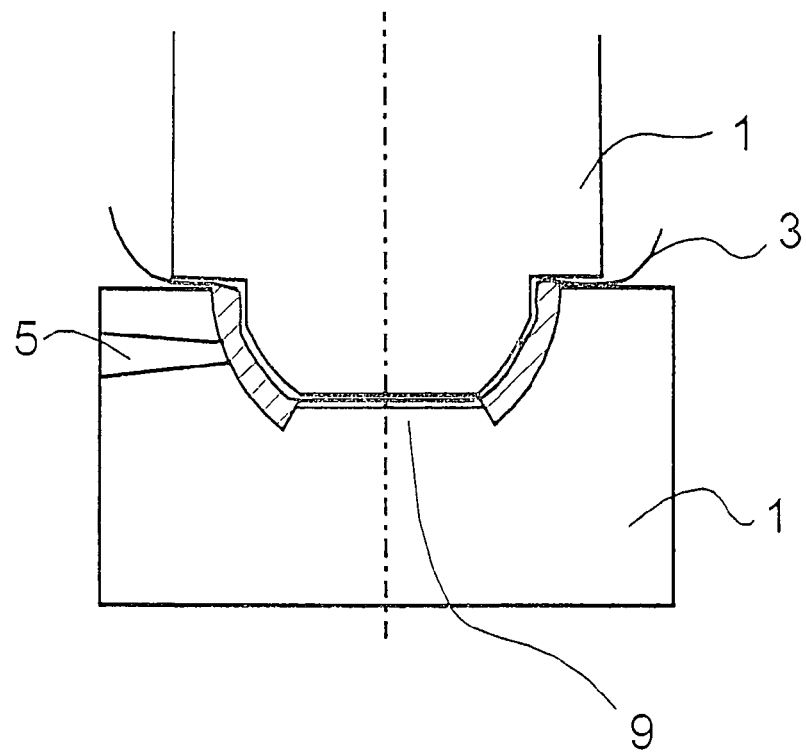
FIG. 3 is a cross sectional view showing the manufacture of a bearing shell upper part with a pole cap cutout.
Figure 4:
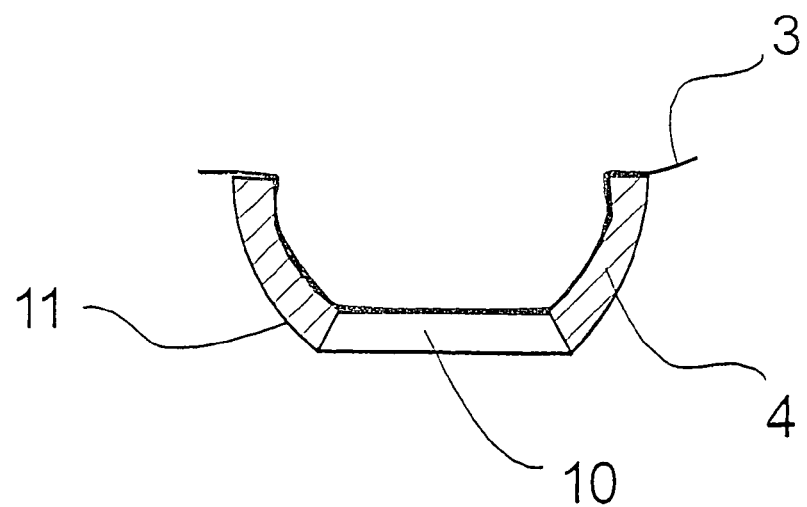
FIG. 4 is a cross sectional view of a bearing shell upper part with a pole cap cutout.

FIG. 3 shows an exemplary embodiment of a mold which makes it possible to produce a bearing shell upper part, as is also shown in FIG. 4, with a pole cap cutout. The special shape of the mold 1 in the form of a projection 9 makes it possible to produce pole cap cutouts 10, into which a ball pivot, not shown, is later inserted.

The manufacture of a one-part bearing shell is not shown. The manufacture of a one-part bearing shell is also possible due to the corresponding design of the mold with a corresponding shape of the film.

While specific embodiments of the invention have been shown and described in detail to illustrate the application of the principles of the invention, it will be understood that the invention may be embodied otherwise without departing from such principles.

LIST OF REFERENCE NUMBERS

1 Mold
2 Bearing shell lower part
3 Film
4 Backed plastic
5 Sprue
6 Bearing shell lower part with angular bottom
7 Bearing shell lower part with round bottom
8 Circumferential collar
9 Projection, mold
10 Pole cap cutout
11 Bearing shell upper part

What is claimed is:

1. A bearing shell for a ball and socket joint, the bearing shell comprising:
 a core comprising a plastic material and a reinforcement additive in the plastic material comprising one or more of fibers and beads, said core having a core outer surface for contact with a ball joint housing, said core having a concave core inner surface; and
 a film formed separate from said core, said film comprising a sheet structure molded to conform to the shape of the core inner surface and having a concave film inner surface and a convex film outer surface, said convex film outer surface of said film engaging said concave core inner surface such that said film and said core form an integral bearing shell, said reinforcement additive in the plastic material of said core reinforcing said bearing shell, said film consisting of a plastic sheet material that is unreinforced or a plastic sheet material that is unreinforced and is provided with a tribological additive, said plastic material of said film and said plastic material of said core consisting of the same plastic material, said concave film inner surface forming an inner surface of said bearing shell for contacting a joint ball of a ball pin, said concave film inner surface being spherical in at least some areas of said bearing shell.

2. A bearing shell in accordance with claim 1, wherein said bearing shell has a multipart design with each part including a plastic core jacketed by film at least in some areas.

3. A bearing shell in accordance with claim 2, wherein said bearing shell has a bearing shell lower part and a bearing shell upper part, wherein said bearing shell lower part and/or said bearing shell upper part have said core consisting of a plastic, which is jacketed by a film at least in some areas.

4. A bearing shell in accordance with claim 3, wherein said bearing shell lower part and/or said bearing shell upper part has tolerance-compensating slots in said core.

5. A bearing shell in accordance with claim 3, wherein said bearing shell upper part has cutouts in the pole area.

6. A bearing shell according to claim 3, wherein said tribological additive has lubrication characteristics and a low coefficient of friction.

7. A bearing shell in accordance with claim 3, wherein said same plastic material is a duroplastic.

8. A bearing shell in accordance with claim 1, wherein said same plastic material is a duroplastic or a thermoplastic.

9. A bearing shell in accordance with claim 8, wherein said concave film inner surface is a free surface.

10. A bearing shell in accordance with claim 1, wherein said same plastic material is a thermoplastic.

11. A bearing shell in accordance with claim 1, wherein said concave film inner surface is a free surface.

12. A bearing shell according to claim 11, wherein said tribological additive has anti-friction properties.

13. A bearing shell in accordance with claim 1, wherein said film has a ring-shaped front film surface, said ring-shaped front film surface surrounding said concave film inner surface, said core having a ring-shaped front core surface, said ring-shaped front film surface engaging said ring-shaped front core surface.

14. A bearing shell in accordance with claim 13, wherein said ring-shaped front core surface surrounds said concave core inner surface.

15. A bearing shell in accordance with claim 1, wherein a portion of said core and a portion of said film form an outwardly directed circumferential collar.

16. A bearing shell in accordance with claim 1, wherein said reinforcement additive only comprises fibers.

17. A ball and socket joint, comprising:
a ball and pin; and
a bearing shell comprising an upper bearing shell part and a lower bearing shell part, said upper bearing shell part and said lower bearing shell part each having a film and a core made of a particular plastic material, said film being formed separate from said core, said film comprising a sheet structure molded to conform to shape of the core and having an outer film surface and an inner film surface, said core having reinforcing additives in the plastic material for reinforcing said bearing shell, said reinforcing additives comprising one or more of fibers and beads, said core having an inner core surface, said ball being disposed in said bearing shell, said core being separated from being in direct contact with said ball by said film jacketing said core, said film comprising a particular plastic sheet material wherein said film particular plastic material and said core particular plastic material consist of the same particular plastic material, said film having tribological additives in said plastic material, said film sheet material being inserted into said core such that said outer film surface is fixed to said inner core surface, said inner film surface being in sliding contact with said ball, said lower bearing shell part defining a cut out portion for receiving said pin.

18. A ball and socket joint in accordance with claim 17, wherein said particular plastic material has tribological properties, said lower bearing shell part having a radially extending collar, said radially extending collar being formed of a portion of said film and a portion of said core, said collar engaging a surface of said upper bearing shell part.

19. A bearing shell for a ball and socket joint, the bearing shell comprising:
a core for insertion into a ball joint housing, said core comprising a particular plastic material and a reinforcing additive in the particular plastic material, said reinforcing additive comprising one or more of fibers and beads, said core having a concave core inner surface and an outer core surface for contacting a ball joint housing surface;
a film formed separate from said core, said film comprising a sheet structure molded to conform to the shape of the core inner surface and having an outer convex film surface and an inner concave film surface, said film being inserted into said core such that said outer convex film surface is in contact with said concave core inner surface, whereby said film and said core form a unitary bearing shell structure, said reinforcing additive of said core reinforcing said bearing shell structure, said inner concave film surface forming a free surface of said bearing shell structure for engaging a joint ball, said inner concave film surface being at least spherical in some portions, said film consisting of a particular plastic sheet material that is unreinforced or a particular plastic sheet material that is unreinforced and is provided with a tribological additive having anti-friction characteristics, said particular plastic material of said film and said particular plastic material of said core consisting of the same particular plastic material; and
a radially extending collar formed of a portion of said core and a portion of said film, said portion of said film of said collar defining a contact surface for engaging a surface of an opposing bearing shell portion arranged within the ball joint housing.

20. A bearing shell for a ball and socket joint, the bearing shell comprising:
a core comprising a plastic material and a reinforcement additive in the plastic material comprising one or more of fibers and beads, said core having a core outer surface for contact with a ball joint housing, said core having a concave core inner surface;
a film formed separate from said core, said film comprising a sheet structure molded to conform to the shape of the core inner surface and having a concave film inner surface and a convex film outer surface, said convex film outer surface of said film engaging said concave core inner surface such that said film and said core form an integral bearing shell, said reinforcement additive in the plastic material of said core reinforcing said bearing shell, said film consisting of a plastic sheet material that is unreinforced or a plastic sheet material that is unreinforced and is provided with a tribological additive having lubrication characteristics and a low coefficient of friction, said plastic material of said film and said plastic material of said core consisting of the same plastic material, said concave film inner surface forming an inner surface of said bearing shell for contacting a joint ball of a ball pin, said concave film inner surface being spherical in at least some areas of said bearing shell; and
a collar formed of a radially extending portion of said core and a radially extending portion of said film, said radially extending portion of said film defining a contact surface for engaging a surface of an opposing bearing shell portion arranged within the ball joint housing.

21. A bearing shell for a ball and socket joint, the bearing shell comprising:
a core comprising a plastic material and a reinforcement additive in the plastic material, said reinforcement additive comprising one or more of fibers and beads, said core having a core outer surface for contact with a ball joint housing, said core having a concave core inner surface;
a film formed separate from said core, said film comprising a sheet structure molded to conform to the shape of the core inner surface and having a concave film inner surface and a convex film outer surface, said convex film outer surface of said film engaging said concave core inner surface such that said film and said core form an integral bearing shell, said reinforcement additive in the plastic material of said core reinforcing said bearing shell, said film consisting of a plastic sheet material that is unreinforced or a plastic sheet material that is unreinforced and is provided with a tribological additive, said plastic material of said film and said plastic material of said core consisting of the same plastic material, said concave film inner surface forming an inner surface of said bearing shell for contacting a joint ball of a ball pin, said concave film inner surface being spherical in at least some areas of said bearing shell, said core being formed by placing said film sheet material into a mold and injecting said plastic material behind said film to provide the plastic core as a backing with the film jacketing said core, wherein the film receives a shape defined by said mold; and a collar formed of a portion of said core and a portion of said film, said portion of said core and said portion of said film extending in a radial direction, said portion of said film defining a contact surface for engaging a surface of an opposing bearing shell portion arranged with the ball joint housing.

22. A bearing shell for a ball and socket joint, the bearing shell comprising:

a core comprising a plastic material and a reinforcement additive in the plastic material comprising one or more of fibers and beads, said core having a core outer surface for contact with a ball joint housing, said core having a concave core inner surface;

a film formed separate from said core, said film comprising a sheet structure molded to conform to the shape of the core inner surface and having a concave film inner surface and a convex film outer surface, said convex film outer surface of said film engaging said concave core inner surface such that said film and said core form an integral bearing shell, said reinforcement additive in the plastic material of said core reinforcing said bearing shell, said film consisting of a plastic sheet material that is unreinforced or a plastic sheet material that is unreinforced and is provided with a tribological additive, said plastic material of said film and said plastic material of said core consisting of a duroplastic, said concave film inner surface forming an inner surface of said bearing shell for contacting a joint ball of a ball pin, said concave film inner surface being spherical in at least some areas of said bearing shell; and a collar extending in a radial direction, said collar being formed of a radially extending portion of said core and a radially extending portion of said film, said radially extending portion of said film defining a contact surface for engaging a surface of an opposing bearing shell portion arranged within the ball joint housing.

23. A ball and socket joint, comprising:

a ball and pin; and a bearing shell comprising an upper bearing shell portion and a lower bearing shell portion, said upper bearing shell portion and said lower bearing shell portion each comprising a film and a core made of a particular plastic material, said film being formed separate from said core, said film comprising a sheet structure molded to the shape of the core and having an outer film surface and an inner film surface, said core having reinforcing additives in the plastic material for reinforcing said bearing shell, said reinforcing additives comprising one or more of fibers and beads, said core having an inner core surface, said lower bearing shell portion defining a cut out portion for receiving said pin, said ball being disposed in said bearing shell such that said pin extends through said cut out portion of said lower bearing shell portion, said core being separated from being in direct contact with said ball by said film jacketing said core, said film comprising a particular plastic sheet material wherein said film particular plastic material and said core particular plastic material consist of a duroplastic, said film having tribological additives in said plastic material, said film sheet material being inserted into said core such that said outer film surface is fixed to said inner core surface, said inner film surface being in sliding contact with said ball, said lower bearing shell portion having a radially extending collar, said radially extending collar being formed of a radially extending portion of said film and a radially extending portion of said core, said collar engaging a surface of said upper bearing shell portion.

24. A bearing shell for a ball and socket joint, the bearing shell comprising:

a core for insertion into a ball joint housing, said core comprising a particular plastic material and a reinforcing additive in the particular plastic material, said reinforcing additive comprising one or more of fibers and beads, said core having a concave core inner surface and an outer core surface for contacting a ball joint housing surface;

a film formed separate from said core, said film comprising a sheet structure molded to conform to the shape of the core inner surface and having an outer convex film surface and an inner concave film surface, said film being inserted into said core such that said outer convex film surface is in contact with said concave core inner surface, whereby said film and said core form a unitary bearing shell structure, said reinforcing additive of said core reinforcing said bearing shell structure, said inner concave film surface forming a free surface of said bearing shell structure for engaging a joint ball, said inner concave film surface being at least spherical in some portions, said film consisting of a particular plastic material that is unreinforced or a particular plastic sheet material that is unreinforced and is provided with a tribological additive having anti-friction characteristics, said particular plastic material of said film and said particular plastic material of said core consisting of the same particular plastic material, said same particular plastic material being a duroplastic; and a radially extending collar formed of a radially extending portion of said core and a radially extending portion of said film, said radially extending portion of said film defining a contact surface for engaging a surface of an opposing bearing shell portion arranged within the ball joint housing.

* * * * *